United States Patent [19]

Ostertag

[11] Patent Number: 4,552,593

[45] Date of Patent: Nov. 12, 1985

[54] PREPARATION OF EFFECT PIGMENTS COATED WITH METAL OXIDES

[75] Inventor: Werner Ostertag, Gruenstadt, Fed. Rep. of Germany

[73] Assignee: BASF Aktiengesellschaft, Ludwigshafen, Fed. Rep. of Germany

[21] Appl. No.: 538,274

[22] Filed: Oct. 3, 1983

[30] Foreign Application Priority Data

Oct. 8, 1982 [DE] Fed. Rep. of Germany ....... 3237264

[51] Int. Cl.$^4$ ...................... C04B 31/26; C04B 31/00; C08K 7/00
[52] U.S. Cl. ................................. 106/291; 106/288 B; 106/308 B
[58] Field of Search ........................................ 106/291

[56] References Cited

U.S. PATENT DOCUMENTS

| | | | |
|---|---|---|---|
| 3,087,827 | 4/1963 | Klenke et al. | 106/291 |
| 3,087,828 | 4/1963 | Linton | 106/291 |
| 3,342,617 | 9/1967 | Jackson | 106/291 |
| 3,582,382 | 6/1971 | Watanabe et al. | 106/291 |
| 3,650,790 | 3/1972 | Klenke et al. | 106/291 |
| 3,711,308 | 1/1973 | Brand et al. | 106/291 |
| 3,874,890 | 4/1975 | Bernhard et al. | 106/291 |
| 4,038,099 | 7/1977 | DeLuca et al. | 106/291 |
| 4,086,100 | 4/1978 | Esselborn et al. | 106/291 |
| 4,134,776 | 1/1979 | Rieger et al. | 106/291 |
| 4,146,403 | 3/1979 | Armanini et al. | 106/291 |
| 4,344,987 | 8/1982 | Ostertag et al. | 427/213 |

FOREIGN PATENT DOCUMENTS 2454138 5/1975 Fed. Rep. of Germany .

Primary Examiner—Herbert S. Cockeram
Attorney, Agent, or Firm—Oblon, Fisher, Spivak, McClelland & Maier

[57] ABSTRACT

Effect pigments are prepared by a process in which a pigment substrate comprising flaky particles, of which from 10 to 90% by weight have a longest dimension of from 60 to 400 $\mu$m and the remainder have a longest dimension of from 3 to 30 $\mu$m, are treated, in a fluidized bed, with one or more metal chlorides and steam in the gas phase, at elevated temperatures. During this procedure, the particles are coated with metal oxide. After coating, the fraction having a particle size of from 3 to 30 $\mu$m is separated off as the effect pigment.

The coatings obtained adhere very firmly to the flaky particles.

The pigments are used for coloring finishes, plastics, cosmetic products and glasses.

18 Claims, No Drawings

PREPARATION OF EFFECT PIGMENTS COATED WITH METAL OXIDES

The present invention relates to a process for the preparation of effect pigments coated with metal oxides.

Effect pigments based on mica flakes coated with metal oxides are known as nacreous pigments. Ideally, these pigments consist of very thin planar muscovite discs coated with a uniform metal oxide film. In finishes and plastics, these pigments display interesting optical effects: they impart high luster and a nacreous appearance to the colorations. The optical behavior of these nacreous pigments is predominantly determined by reflection and interference. Pigment particles have, as a rule, diameters of from 5 to 30 μm and are from 0.1 to 0.5 μm thick (German Published Application DAS No. 1,467,468, German Laid-Open Applications DOS No. 2,106,613, DOS No. 2,522,572, DOS No. 1,959,998 and DOS No. 2,244,298 and U.S. Pat. Nos. 4,146,403 and 3,087,828).

Among the metal oxide coatings on mica flakes, coatings containing $TiO_2$ are the most important. However, coatings containing other oxides, eg. $ZrO_2$, $V_2O_5$ or $Cr_2O_3$, are also known. It is critical for the optical effect of the nacreous pigments that the coating is a metal oxide of high refractive index. The interest in rutile ($n=2.7$), anatase ($n=2.4$) and $ZrO_2$ ($n=2.4$) coatings is therefore understandable, since the mica flakes in plastics or in finishes only become visible at all when they are coated with materials of high refractive index. Uncoated mica flakes do not display any nacreous effect in these media, since the refractive index of mica ($n=1.5-1.6$) is very similar to that of the plastics and finishes ($n=1.6$).

For the preparation of thin metal oxide coatings, in particular of $TiO_2$ coatings, two basically different processes are known:
(a) coating by means of a gas-phase reaction between $TiCl_4$ vapor and $H_2O$ vapor and
(b) coating by precipitation of hydrated $TiO_2$ in an aqueous medium. Industrially, only the latter process has become important.

Although it is known that the gas-phase reaction gives coatings which adhere well and possess a uniformity which is otherwise virtually unattainable, pigment manufacturers consider gas-phase coating methods to be too complicated technically, and hence unsuitable. For this reason, virtually none of the pigment manufacturers has been concerned hitherto with coatings in the gas phase.

U.S. Pat. No. 3,582,382 describes a process for the preparation of $TiO_2$-coated micas. In this process, the mica substrate is moved through a heated, inclined rotating tube, and at the same time $TiCl_4$ vapor and moist air are reacted in the rotating tube, in the presence of the mica substrate. The $TiO_2$ formed as the result of hydrolysis coats the accessible surfaces of the mica. A disadvantage of the process is that only some of the flakes are coated by this procedure, those flakes covered by other mica flakes remaining uncoated. Moreover, the process is extremely tedious. To produce thicker coatings, the mica material has to be passed several times through the rotating tube.

Furthermore, German Laid-Open Application DOS No. 2,454,138 disclosed a process for the gas-phase coating of isometric $Al_2O_3$ particles of about 10 μm size. In this process, the powder to be coated is treated with $TiCl_4$ vapor and $H_2O$ vapor in a fluidized bed heated at 200° C. The procedure gives $TiO_2$-coated $Al_2O_3$, which is used for the production of certain types of electrolytic capacitors. The fluidized bed is vibrated during the coating procedure.

The process disclosed in German Laid-Open Application DOS No. 2,454,138 cannot be used for the preparation of effect pigments, since the mica substrates are only 0.1–0.5 μm thick and cannot be fluidized in a fluidized bed so that they are coated on all sides in the reaction in the gas phase. Experiments show that the fine mica particles agglomerate in the fluidized bed, and accordingly, instead of the discrete particles, the agglomerates are coated in the gas-phase coating process. Even the setting up of a vibrating fluidized bed in which the fluidization of the material in this bed is promoted by vibration does not lead to a successful result. Moreover, setting up a vibrating fluidized bed on a production scale is bound to entail considerable difficulties and be very expensive.

On the basis of the above fact, it is understandable that, for the industrial production of nacreous pigments, the coating processes used hitherto have been exclusively those carried out in a liquid medium. In the case of $TiO_2$-coated pigments, such a process is carried out, for example, as follows: mica flakes having a selected particle size are introduced into a liquid, generally water. Titanium compounds dissolved in this suspension are decomposed by careful and controlled hydrolysis. Under certain conditions, titanium hydroxide or hydrated titanium dioxide can be precipitated onto the suspended mica flakes. After the coating procedure, the coated pigment is filtered off, washed, dried and heated. During heating, the hydrated $TiO_2$ is converted to anhydrous $TiO_2$.

Problems inherent in the wet process for the preparation of nacreous pigments are that the coating does not possess adequate adhesion, and a homogeneous coating can be obtained only by means of special measures.

One of the sources of difficulty is that, during the coating procedure, a voluminous hydroxide precipitate is first deposited onto the mica surface, and this precipitate is converted to the $TiO_2$ coating only during the subsequent drying and heating stages, with a substantial weight loss.

It is obvious that $TiO_2$ layers which become detached result in a deterioration in the optical properties of the pigment; this causes considerable difficulties for the user of the pigment.

In the view of pigment specialists, it is desirable for the high quality of the surface coating obtained by gas-phase reaction also to be achieved in the preparation of nacreous pigments.

It is an object of the present invention to provide a process which makes possible gas-phase coating of flaky pigment substrates, having a particle size >30 μm, in a fluidized bed, and which does not lead to coated agglomerates or non-uniformly coated substrates. Because of the fact that it is expected to be difficult to carry out industrially, vibration of the fluidized bed should be avoided.

We have found that this object is achieved by the process of the present invention, and that effect pigments coated with one or more metal oxides are obtained at elevated temperatures by coating particles fluidized in a fluidized bed, with the aid of a reaction between one or more metal chlorides and water in the gas phase, if the fluidized pigment substrate used comprises flaky particles of which from 10 to 90% by weight have a longest dimension of $\geq 60$ μm and the remainder have a longest dimension of $\geq 30$ μm.

It is surprising that, in the mixture in the fluidized bed, the large particles do not separate from the substantially more finely divided particles. Because of the behavior of isometric particles of greatly differing size in a fluidized bed (where the particles separate out according to size), it was to be expected that separation would occur in this case too. Surprisingly, the large particles, which are distributed uniformly over the entire fluidized bed, effect complete fluidization of the fine particles and reliably prevent agglomeration of the fine particles.

After coating, the large particles can be readily separated off from the desired fine pigment particles by sieving.

The effect pigments obtained by the process are used for coloring finishes, plastics, cosmetic products and glasses. The coatings applied by the novel process adhere very firmly to the flaky substrate, so that no special safety measures are required when the pigment is incorporated into finishes or plastics.

Electron microscope photographs show that gas-phase coating according to the invention, for example using $TiCl_4$, gives very uniform $TiO_2$ coatings. In contrast to the coatings obtained by the liquid-phase method, the coatings exhibit a relatively high degree of physical homogeneity, and the formation of isolated areas of coating is virtually completely absent.

Another advantage of the novel process is that the coating obtained is not hydrated and amorphous, but anhydrous and crystalline.

The controlled coating of pigment substrates with one or more oxides by reaction in the gas phase, where coating can take place simultaneously or in succession, is a substantial advantage of the novel process over the prior art coating processes in a liquid medium. In the latter processes, the hydroxides differ substantially in their precipitation behavior in some cases. Moreover, the precipitation behavior is strongly dependent on the ion concentration of the particular elements.

If the $TiO_2$-coated products are prepared at $250 \pm 50°$ C., the $TiO_2$ coatings have an anatase structure. By heating the pigments at $>500°$ C., eg. at as high as $1,200°$ C., the anatase coatings can be converted to the rutile form.

The novel process is carried out in general as follows: flaky particles of the desired size, as a rule $\geq 30$ μm, are mixed with not less than 10% by weight, based on the mixture, of larger flaky particles whose longest dimension is about 60–400 μm, and the mixture is introduced into a fluidized-bed apparatus capable of being heated. The fluidized bed is produced by means of a sieve tray or fritted tray, by blowing in and/or circulating air, nitrogen, other inert gases or a mixture of these. Depending on the heat balance, the gases are either heated or cooled beforehand. For the reaction, steam is mixed with the fluidizing gas. The metal chloride vapors, undiluted or diluted with a carrier gas, are introduced into the fluidized bed via a nozzle located laterally above the gas-distributing tray of the fluidized-bed reactor. The HCl-containing waste gas which emerges via a filter or a cyclone is passed through an NaOH wash and freed from HCl. The reaction time depends on the desired thickness of the coating. When this is achieved, the coated product is discharged from the reactor and is separated into the desired fractions by passing it through sieves.

The temperature of the fluidized bed is above 100° C., advantageously from 200° to 300° C., so that no $H_2O$ vapor condenses. At above 200° C., the hydrolysis in the gas phase takes place sufficiently rapidly for the chlorides to be completely converted to the oxides with a bed height of only 50 cm.

It has proved advantageous to use an amount of steam which is substantially above the stoichiometric amount, for example from 2 to 20 times the stoichiometric amount.

Suitable flaky particles for the effect pigments are those whose longest dimension is $\leq 30$ μm, preferably 3–30 μm, in particular 5–25 μm. Preferably, these particles have a layer thickness of from about 0.1 to about 0.5 μm.

To prevent the formation of agglomerates, the fine particles are mixed with larger flaky particles of the same material which have a longest dimension of about 60–400, preferably about 90–150, μm. The proportion of these larger particles is from 10 to 90, preferably from 20 to 60, % by weight, based on the mixture. Preferred flaky particles are mica flakes.

The temperature of the fluidized bed is advantageously from 200° to 500° C., preferably from 220° to 260° C. Examples of suitable chlorides for the reaction with steam in the gas phase and for the coating procedure giving effect pigments are titanium(IV) chloride, tin(IV) chloride and iron(III) chloride.

Among the volatile metal chlorides which are suitable for the reaction in the gas phase, $TiCl_4$ is by far the most important. In addition to $TiCl_4$, other volatile chlorides can be introduced into the fluidized bed, either simultaneously or subsequently, for example $SiCl_4$ or $AlCl_3$. For example, the optical appearance of $TiO_2$-coated effect pigments can be varied somewhat by means of a subsequent gas-phase reaction with $SiCl_4$, which is converted to $SiO_2$ during this reaction. On the other hand, it is known that conversion of a $TiO_2$ coating to the rutile form can be accelerated, during heating, by means of $SnO_2$ precipitated from $SnCl_4$ in a gas-phase reaction.

The amount of chloride vapor introduced into the fluidized bed in unit time can vary within a wide range, but it is advantageous to carry out the procedure so that this amount does not exceed 10 vol. percent, based on the volume of the other gases fed in.

The novel process can also be used to produce coatings consisting of a plurality of layers, and these can consist of the same oxide or of different oxides.

The process can be used to coat glass flakes, eg. flake glass (mean particle diameter 0.4 mm), for example with $TiO_2$ or $TiO_2/SnO_2$, by reaction of $TiCl_4$, or of $TiCl_4$ and $SnCl_4$, with water in the gas phase. Because of their size, the glass flakes coated in this manner are of little interest as pigments.

In inorganic pigment chemistry, the application of such coatings is widely used, since this permits stabilization of the pigmentary forms. The vast majority of all commercial inorganic pigments are stabilized by means of coatings. Experiments have shown that the process according to the present invention can also be used to apply, as coatings, those oxides conventionally used for stabilization. For example, a first coating of $TiO_2$, $TiO_2+SnO_2$ or $TiO_2+SiO_2$ can be coated with a further layer comprising $Al_2O_3$, $SiO_2$ and/or $P_2O_5$, by vapor-phase reaction of $Al_2Cl_6$, $SiCl_4$ or $PCl_3$, and this process can be repeated.

The coatings of $Al_2O_3$, $SiO_2$ and/or $P_2O_5$ can be applied in a manner similar to that used in the case of the $TiO_2$ coating.

In addition to the stabilization with colorless $TiO_2$, transparent $Al_2O_3$ or $SiO_2$, it is also possible to produce surface coatings with colored oxides. Thus, using the novel process, for example $TiO_2$-coated mica flake pigments can be additionally coated with an iron oxide layer, which can be applied by means of a gas-phase reaction between iron chloride and water. Advantageously, however, coating is effected by oxidation of iron pentacarbonyl vapor by the procedure described in European Laid-Open Application No. 45,851. Moreover, heating at 400°–1,200° C. results in compound formation between the $TiO_2$ layer and the $Fe_2O_3$ layer, giving a golden-yellow coating.

The Examples which follow illustrate the process according to the invention. I. Fluidized-bed apparatus:

The fluidized-bed apparatus used in the Examples is a heated quartz tube which has a diameter of 65 mm and a quartz frit as a base. The fluidizing gas together with the steam required for the reaction are fed through the quartz frit into the fluidized bed. A two-material nozzle is located above the frit and enters the fluidizing space laterally; the gaseous chlorides, with or without an inert carrier gas, are fed in through this nozzle. The chlorides are fed in via the inner nozzle, and as a rule nitrogen or air is blown into the fluidized bed through the outer nozzle.

EXAMPLE 1

150 g of white mica (muscovite) having a mean flake diameter of 15 μm (particle sizes 1–32 μm; obtained by wet milling of mica and passage through a 32 μm sieve) and 150 g of mica having a flake diameter of from 63 to 125 μm (obtained by wet milling, and separating off the finer and coarser fractions by sieving) are introduced into the fluidized-bed apparatus described above and are fluidized with 250 liters (S.T.P.)/hour of air preheated to 200° C. The fluidized material is then heated to 250° C. with the aid of a heater mounted on the outside of the fluidized bed. After the fluidized material has been heated to 250° C., 65 g/hour of steam are mixed with the fluidizing air.

A mixture of 99% of $TiCl_4$ and 1% of $SiCl_4$ is then vaporized uniformly in a vaporizer, the rate of flow being 8 ml/hour.

The chloride vapors are introduced together with a stream of nitrogen (100 liters (S.T.P.)/hour) into the fluidized layer, via the inner nozzle of the two-material nozzle. At the same time, 150 liters/hour of nitrogen are fed in via the outer nozzle.

The reaction is carried out for 4.5 hours at 250° C., after which 8 ml/hour of pure $SiCl_4$ are introduced into the fluidized layer for 1 hour under otherwise identical conditions.

The waste gases liberated during the reaction are passed through a filter and washed with sodium hydroxide solution.

When the experiment is complete, the product is cooled and then removed from the reactor, and the coarse fraction is separated from the desired fine fraction (<32 μm) by sieving. The product contains 4.0% by weight of titanium.

Scanning electron microscope photographs show that the mica flakes have a thin layer of $TiO_2$ and $SiO_2$.

When the product is milled in an alkyd resin/melamine resin finish (DIN draft 53,238) and the dispersion is applied onto a substrate by knife-coating, the resulting coating has a bluish luster and the typical optical characteristics of nacreous pigments.

EXAMPLE 2

300 g of white mica (diameter of the individual particles: 5–90 μm; fraction of particles having a flake diameter >63 μm, determined by sieving: 45% by weight) are introduced into the fluidized-bed apparatus described above and are fluidized with 350 liters (S.T.P.)/hour of fluidizing gas heated to 200° C., the fluidizing gas consisting of 250 liters/hour of nitrogen and 100 liters/hour of air.

The fluidized material is then heated to 210° C. and 18 g/hour of steam are added to the fluidizing gas. 8 ml/hour of $TiCl_4$ vapor mixed with 150 liters/hour of nitrogen carrier gas are then introduced into the fluidized bed via the inner nozzle, and 150 liters/hour of nitrogen are introduced via the outer nozzle.

After 10 hours, the experiment is terminated, and the product is removed from the reactor and calcined for one hour at 1,000° C. The pigment is then separated to obtain the desired fraction (particle size <30 μm) by sieving.

According to chemical analysis, the desired pigment contains 9.1% by weight of Ti. X-ray photographs show that the $TiO_2$ is in the rutile form. When the product is incorporated in finishes, the coatings obtained exhibit typical nacreous characteristics.

EXAMPLE 3

Mica is first coated with titanium dioxide by the process described in Example 2. When coating with $TiO_2$ is complete, the pigment is left in the heated reactor and is fluidized further with the amount of fluidizing gas stated in Example 2. A mixture of iron pentacarbonyl vapor and nitrogen is then introduced into the bed for 1 hour, via the two-material nozzle. The iron pentacarbonyl vapor is produced in a vaporizer to which 10 g/hour of iron pentacarbonyl is uniformly fed. The carbonyl vapor together with 100 liters (S.T.P.)/hour of nitrogen are introduced into the fluidized bed via the inner nozzle of the two-material nozzle, while a further 100 liters/hour of $N_2$ are blown in via the outer nozzle. The product is cooled and then discharged, and the pigment is separated to obtain the desired fraction (<30 μm) by sieving.

Analysis shows that the product contains 9% by weight of Ti and 1.1% by weight of Fe. The iron oxide imparts a brownish yellow appearance to the effect pigment. Otherwise, the product has the typical apearance of a nacreous pigment.

The brownish yellow hue of the pigment can be converted to a yellower hue by heating the pigment at 250° C. for 1 hour. X-ray photographs show that this color change is due to the formation of a compound between $Fe_2O_3$ and $TiO_2$.

EXAMPLE 4

150 g of mica which has been wet-milled and then passed through a sieve of 32 μm mesh size, and a further 50 g of wet-milled mica having a flake diameter of 70–125 μm, are introduced into a fluidized-bed apparatus which is similar to that described above but wherein two two-material nozzles enter laterally above the frit. The mica is then fluidized with 300 liters (S.T.P.)/hour of a 1:1 mixture of air and nitrogen. The temperature of the fluidized bed is increased to 250° C., and, at this temperature, 50 g/hour of H$_2$O are added to the fluidizing air. At the same time as this procedure, TiCl$_4$ vapor is fed continuously into the fluidized bed via one nozzle while, simultaneously, iron pentacarbonyl vapor is fed continuously into the fluidized bed via the other nozzle. The flow rates are 33 ml/hour of liquid TiCl$_4$ and 20 ml/hour of liquid Fe(CO)$_5$. The chloride vapor and the carbonyl vapor are each blown in through the central nozzle of the two-material nozzles, together with 100 liters (S.T.P.)/hour of nitrogen as the carrier. At the same time, 100 liters/hour of nitrogen are blown in through each of the outer nozzles.

After 1¼ hours, the TiCl$_4$ feed and Fe(CO)$_5$ feed are terminated. 30 g/hour of AlCl$_3$ vapor are then fed into the fluidized bed for 10 minutes, with the aid of 100 liters/hour of nitrogen carrier.

After cooling, the coated product is removed from the reactor, and the pigment is separated from the coarser fraction by sieving with a sieve of 32 μm mesh size.

The pigment is heated for 1 hour at 1,100° C. The X-ray photographs show that the pseudorutile structure is formed during heating, ie. a compound of TiO$_2$ with Fe$_2$O$_3$ is formed. The nacreous pigment has a golden yellow hue and, in plastics, has high thermal stability and high luster and gives a typical nacreous effect.

We claim:

1. A process for the preparation of an effect pigment, wherein (i) a pigment substrate comprising flaky particles, of which from 10 to 90% by weight have a longest dimension of 60–400 μm and the remainder have a longest dimension of from 3 to 30 μm, is fluidized in a fluidized bed, (ii) the particles are simultaneously treated at elevated temperatures with one or more metal chlorides and steam in the gas phase, where the particles are coated by hydrolysis of the metal chlorides, and (iii) after coating, that fraction which has a longest particle dimension of from 3 to 30 μm is separated off as the effect pigment.

2. A process as claimed in claim 1, wherein the pigment substrate comprises flaky particles of which from 10 to 90% by weight have a longest dimension of from 90 to 150 μm and the remainder have a longest dimension of from 5 to 25 μm.

3. A process as claimed in claim 1, wherein the metal chloride used is titanium(IV) chloride or a mixture consisting predominantly of titanium(IV) chloride, or is tin(IV) chloride or iron(III) chloride.

4. A process as claimed in claim 2, wherein the metal chloride used is titanium(IV) chloride or a mixture consisting predominantly of titanium(IV) chloride, or is tin(IV) chloride or iron(III) chloride.

5. A process as claimed in claim 1, wherein the treatment with the metal chloride and steam is carried out at from 200° to 500° C.

6. A process as claimed in claim 4, wherein the treatment with the metal chloride and steam is carried out at from 200° to 500° C.

7. A process as claimed in claim 5, wherein the metal chloride used is titanium(IV) chloride or a mixture consisting predominantly of titanium(IV) chloride.

8. A process as claimed in claim 6, wherein the metal chloride used is titanium(IV) chloride or a mixture consisting predominantly of titanium(IV) chloride.

9. A process for the preparation of an effect pigment wherein (i) as the pigment substrate, mica flakes, of which from 10 to 90% by weight have a longest particle dimension of from 60 to 400 μm and the remainder have a longest dimension of from 3 to 30 μm, are fluidized in a fluidized bed, (ii) the fluidized particles are simultaneously treated at from 200° to 500° with one or more metal chlorides and steam in the gas phase, where the particles are coated by hydrolysis of the metal chlorides and (iii) after coating, that fraction which has a longest particle dimension of from 3 to 30 μm is separated off as the effect pigment.

10. A process as claimed in claim 9, wherein from 10 to 90% by weight of the mica flakes have a longest dimension of from 60 to 400 μm and the remainder have a longest dimension of from 5 to 25 μm.

11. A process as claimed in claim 9, wherein the metal chloride used is tin(IV) chloride, iron(III) chloride, titanium(IV) chloride or a mixture of these.

12. A process as claimed in claim 9, wherein the metal chloride used is titanium(IV) chloride.

13. A process as claimed in claim 9, wherein the pigment substrate is coated once or several times with the same metal chloride or with different metal chlorides.

14. A process as claimed in claim 9, wherein the pigment substrate is treated with a mixture of a metal chloride and a metal carbonyl in the presence of steam and of oxygen in the gas phase.

15. A process as claimed in claim 9, wherein the coated substrate is then additionally coated with aluminum oxide, silicon dioxide, phosphorus pentoxide or a mixture of these oxides by reaction of aluminum chloride, silicon(IV) chloride, phosphorus trichloride or a mixture of these chlorides in the gas phase with steam, in the presence or absence of oxygen.

16. A process as claimed in claim 14, wherein the substrate treated with titanium(IV) chloride and steam is then treated with iron pentacarbonyl, in the presence of oxygen, in the gas phase at from 200° to 500° C.

17. A process as claimed in claim 16, wherein the coated pigment substrate is heated at from 400° to 1,200° C.

18. An effect pigment obtained by a process as claimed in claim 9.

* * * * *